United States Patent
McConnell et al.

(10) Patent No.: US 9,489,660 B2
(45) Date of Patent: Nov. 8, 2016

(54) METHODS AND SYSTEMS FOR PUBLIC COLLABORATIVE INTERFACE FOR PRIVATE NETWORK GROUPS

(75) Inventors: Jager McConnell, San Francisco, CA (US); Ciara Peter, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 974 days.

(21) Appl. No.: 13/547,852

(22) Filed: Jul. 12, 2012

(65) Prior Publication Data

US 2013/0018958 A1    Jan. 17, 2013

Related U.S. Application Data

(60) Provisional application No. 61/506,983, filed on Jul. 12, 2011.

(51) Int. Cl.
G06Q 10/10    (2012.01)
H04L 12/58    (2006.01)
G06Q 50/00    (2012.01)
H04L 29/08    (2006.01)

(52) U.S. Cl.
CPC ............ *G06Q 10/101* (2013.01); *G06Q 50/01* (2013.01); *H04L 51/28* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,884,035 A * | 3/1999 | Butman et al. | 709/218 |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff et al. | |
| 6,216,135 B1 | 4/2001 | Brodersen et al. | |
| 6,233,617 B1 | 5/2001 | Rothwein et al. | |
| 6,236,978 B1 | 5/2001 | Tuzhilin et al. | |
| 6,266,669 B1 | 7/2001 | Brodersen et al. | |
| 6,288,717 B1 | 9/2001 | Dunkle et al. | |
| 6,295,530 B1 | 9/2001 | Ritchie et al. | |
| 6,324,568 B1 | 11/2001 | Diec | |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Ninos Donabed
(74) *Attorney, Agent, or Firm* — Dergosits & Noah LLP; Todd A. Noah

(57) ABSTRACT

Systems and methods are provided for a public collaborative interface for private computer networks. A system receives a domain name that enables users associated with the domain name to subscribe to a private network group, wherein the domain name differs from a domain name for the private network group. The system outputs a network feed from a user of the private network group to a display device associated with a user associated with the domain name in response to a determination that the user associated with the domain name is subscribed to the private network group. The system outputs a network feed from the user associated with the domain name to display devices associated with users of the private network group in response to a determination that the user associated with the domain name is subscribed to the private network group. The received domain name can be an email address.

20 Claims, 4 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,840,224 B2 * | 11/2010 | Vengroff ............... H04W 4/02 455/414.1 |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 8,566,328 B2 * | 10/2013 | Tseng et al. .................. 707/748 |
| 2001/0044791 A1 | 11/2001 | Richter et al. |
| 2002/0072951 A1 | 6/2002 | Lee et al. |
| 2002/0075844 A1 * | 6/2002 | Hagen .......................... 370/351 |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0233166 A1 * | 10/2006 | Bou-Diab et al. ............. 370/389 |
| 2008/0294726 A1 * | 11/2008 | Sidman ........................ 709/206 |
| 2009/0063415 A1 | 3/2009 | Chatfield et al. |
| 2009/0281988 A1 * | 11/2009 | Yoo .................... G06F 17/30867 |
| 2010/0105440 A1 * | 4/2010 | Kruzeniski et al. .......... 455/566 |
| 2010/0178036 A1 * | 7/2010 | Heinmiller et al. ............ 386/96 |
| 2010/0179915 A1 * | 7/2010 | Nastacio ................. G06Q 50/01 705/319 |
| 2010/0203876 A1 * | 8/2010 | Krishnaswamy ...... G06Q 30/02 455/418 |
| 2010/0241964 A1 * | 9/2010 | Belinsky ................ G06Q 10/10 715/738 |
| 2010/0313250 A1 * | 12/2010 | Chow ................................ 726/5 |
| 2011/0035503 A1 * | 2/2011 | Zaid et al. ..................... 709/228 |
| 2011/0055713 A1 * | 3/2011 | Gruenewald et al. ......... 715/738 |
| 2011/0131663 A1 * | 6/2011 | Kaikuranta ............ G06F 3/0486 726/28 |
| 2011/0154208 A1 * | 6/2011 | Horii ...................... H04L 67/22 715/736 |
| 2011/0264523 A1 * | 10/2011 | Scott .................... G06Q 10/101 705/14.52 |
| 2012/0042280 A1 * | 2/2012 | Hoffman ............ G06F 17/30867 715/800 |
| 2012/0072297 A1 * | 3/2012 | Chou .................... G06Q 10/101 705/26.3 |
| 2012/0197871 A1 * | 8/2012 | Mandel ............. G06F 17/30994 707/722 |
| 2012/0233191 A1 * | 9/2012 | Ramanujam ...... G06F 17/30867 707/758 |
| 2012/0245963 A1 * | 9/2012 | Peak ..................... G06Q 50/01 705/4 |
| 2012/0265678 A1 * | 10/2012 | Ross ..................... G06Q 50/01 705/42 |
| 2012/0297313 A1 * | 11/2012 | Sharma ........................ 715/751 |
| 2012/0307281 A1 * | 12/2012 | Sweet ........................... 358/1.14 |
| 2013/0007029 A1 * | 1/2013 | Ziemann ....................... 707/758 |

* cited by examiner

FIG. 2

METHODS AND SYSTEMS FOR PUBLIC COLLABORATIVE INTERFACE FOR PRIVATE NETWORK GROUPS

CLAIM OF PRIORITY

This application claims the benefit of U.S. Provisional Patent Application 61/506,983 entitled PUBLIC CHATTER, by McConnell, et al., filed Jul. 12, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PUBLIC COLLABORATIVE INTERFACE FOR PRIVATE NETWORK GROUPS

One or more implementations relate generally to a public collaborative interface for private network groups.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Some enterprises use computers to provide private network groups that enable real-time collaboration for their users. An example of a system that provides private network groups is salesforce.com's chatter. A private network group sends information proactively via a real-time news stream, or network feed. Users can subscribe to follow groups to receive broadcast updates about projects and customer statuses. Users can also post messages on the profiles of other members of their network group to collaborate on projects and customer service. Accordingly, it is desirable to provide techniques that enable a database system providing private network groups to improve the performance, efficiency, and the ease of use for collaborative work.

BRIEF SUMMARY

In accordance with embodiments, there are provided systems and methods for a public collaborative interface for private network groups. These systems and methods use a domain name to enable users associated with the domain name to subscribe to a private network group. This domain name that the system uses for adding subscriptions differs from the private network group's domain name. For example, an administrator for Acme Computers, which uses the domain name acmecomputers.com for its private network groups, submits the domain name softwareconsultants.com to the system. Submitting this domain name enables the software engineers working for the company Software Consultants to subscribe to Acme Computer's private network group called New Products Group. The system outputs a network feed from the private network group to a user associated with the domain name if the user is subscribed to the private network group. For example, the system sends a New Product Group network feed from an Acme Computer hardware engineer to Software Consultants' software engineers. The system outputs a network feed from the user associated with the domain name to the private network group if the user is subscribed to the private network group. For example, the system sends a New Products Group network feed from a Software Consultants software engineer to Acme Computers' hardware engineers. Accordingly, systems and methods are provided which enable a database system to easily convert private network groups into public network groups.

While one or more implementations and techniques are described with reference to an embodiment in which a public collaborative interface for private network groups is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2 is a screen shot illustrating a frame of an example user interface screen of a display device supporting methods for a public collaborative interface for private network groups;

DETAILED DESCRIPTION

General Overview

Systems and methods are provided for a public collaborative interface for private network groups.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for a public collaborative interface for private network groups will be described with reference to example embodiments.

The following detailed description will first describe a method for using a new domain name to enable users associated with the domain name to subscribe to a private network group, and outputting network feeds between the users associated with the domain name and the previous users of the private network groups.

Next, a screen shot illustrating a frame of an example user interface screen is described.

Figure 1:
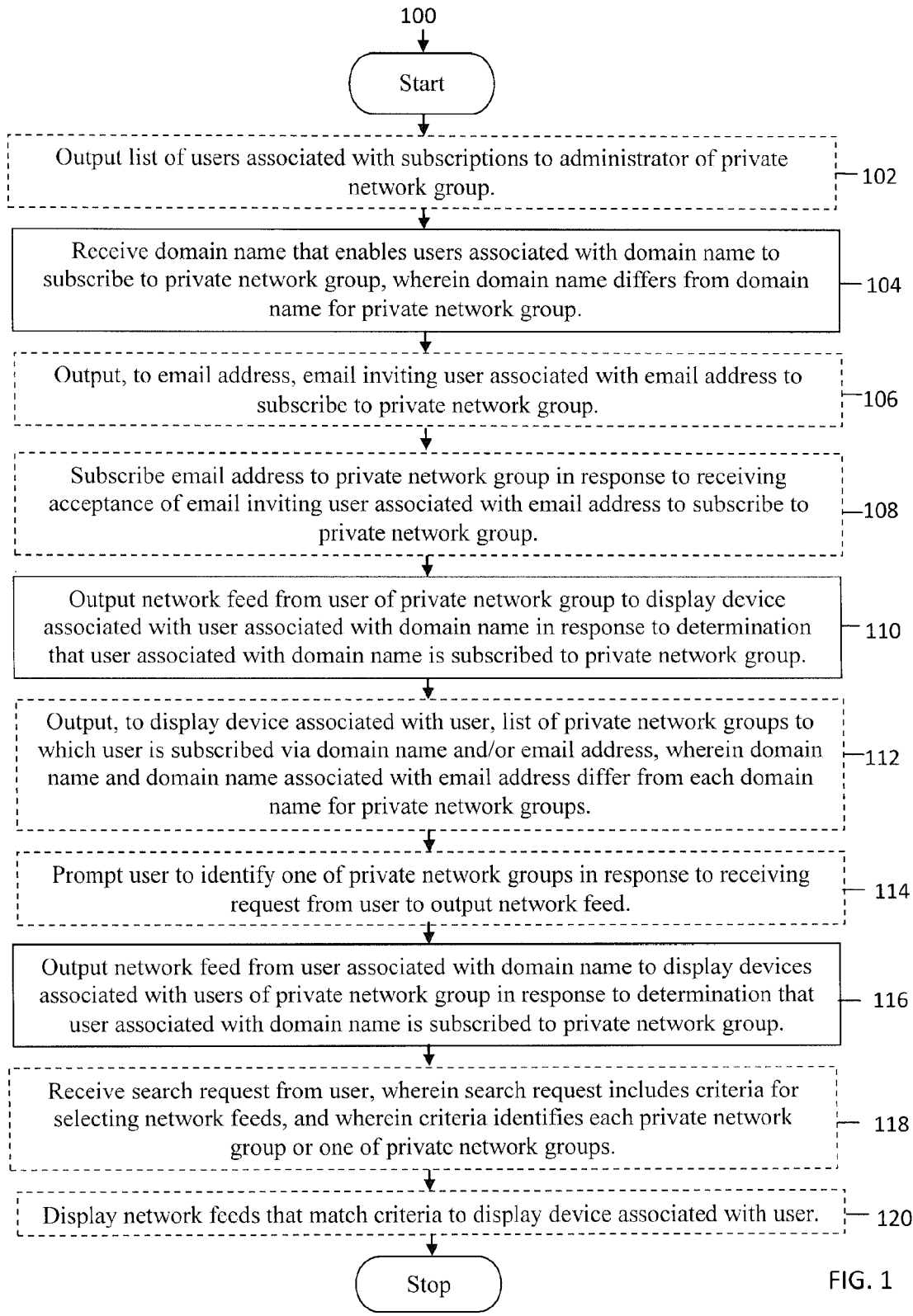
FIG. 1 is an operational flow diagram illustrating a high level overview of a method for a public collaborative interface for private network groups in an embodiment.

FIG. 1 is an operational flow diagram illustrating a high level overview of a method 100 for a public collaborative interface for private network groups in an embodiment. As shown in FIG. 1, a database system can enable a user not associated with a private network group's domain name to subscribe to the private network group, output network feeds to the network group, and receive network feeds from the network group.

In block 102, a list of users associated with subscriptions is optionally output to an administrator of a private network group. For example and without limitation, this can include the database system outputting a list of Acme Computers hardware engineers who are subscribed to the Acme Computers New Products Group to the administrator of the Acme Computers New Products Group. By reviewing subscriptions to private network groups, administrators of private network groups may be able to determine to whom to offer subscriptions to the private network groups.

In block 104, a domain name is received that enables users associated with the domain name to subscribe to a private network group, wherein the domain name differs from a domain name for the private network group. By way of example and without limitation, this can include the database system receiving the domain name softwareconsultants.com from the administrator of the Acme Computers New Products Group. The softwareconsultants.com domain name that enables Software Consultants' software engineers to subscribe to the Acme Computers New Products Group differs from domain name acmecomputers.com for the Acme Computers New Products Group. In prior art systems, computer systems typically limit subscriptions to a private network group to users that share the same domain name with the private network group.

The domain name may be an email address. For example, rather than offering a subscription to the Acme Computers New Products Group to all of the software engineers who work for Software Consultants, the administrator of the Acme Computers New Products Group may offer a subscription to the Acme Computers New Products Group to John Smith, one software engineer who works for Software Consultants. The administrator offers this individual subscription by entering "johnsmith@softwareconsultants.com" as the subscription offer into the database system.

The domain name may enable subscriptions by the general public. For example, the administrator for Acme Computers' Career Group can convert this private network group to a public network group by entering "anyone" as the domain name for subscription offers. Subsequently, anybody who has Internet access can visit Acme Computers' Career Group at acmecomputers.com/careers, and subscribe to Acme Computer's Career Group. Anyone, even unauthenticated users, can read the network feeds at the Acme Computer's Career Group webpage. An Internet user can log in to the Acme Computer's Career Group webpage to subscribe to the network feeds from the Acme Computer's Career Group, such as requesting that the network feeds be sent directly to the Internet user's mobile phone.

A subscription to the network group may be based on a role associated with an organization. For example, the administrator of a network group can provide a subscription offer to the network group based on job titles within a company, such as the software engineers who work for Software Consultants. The role associated with an organization may be at least partially based on a determination made by an algorithm of a business directory, such as salesforce.com's data.com. For example, data.com may assign the role "software engineer" to different individuals with different titles in the Software Consultants organizational hierarchy based on an analysis of the Software Consultants' hierarchy of job titles.

In block 106, an email inviting a user associated with an email address to subscribe to a private network group is optionally output to the email address. In embodiments, this can include the database system outputting an email inviting John Smith to subscribe to the Acme Computers New Products Group. If the database system invites all of the software engineers at Software Consultants to subscribe to the Acme Computers New Products Group, the database system may output email invitations to the email address for each of the software engineers.

In block 108, an email address is optionally subscribed to a private network group in response to receiving an acceptance of an email inviting a user associated with the email address to subscribe to the private network group. For example and without limitation, this can include the database system subscribing John Smith's email address to the Acme Computers New Products Group after John Smith accepts the email invitation. The user associated with the domain name may be disabled from viewing the list of users associated with subscriptions by the administrator of the private network group. For example, the Acme Computers New Products Group administrator may disable John Smith from viewing the list of all the Acme Computers hardware engineers who are subscribed to the Acme Computers New Products Group. Subsequently, John Smith may receive network feeds from each of the Acme Computers hardware engineers who are subscribed to the Acme Computers New Products Group, but John Smith may not be able to initiate private communications with the Acme Computers hardware engineers who are subscribed to the Acme Computers New Products Group.

In block 110, a network feed from a user of a network group is output to a display device associated with a user associated with a domain name in response to a determination that the user associated with the domain name is subscribed to the network group. By way of example and without limitation, this can include the database system sending a New Product Group network feed from an Acme Computer hardware engineer to Software Consultants' software engineers. The display device may be a handheld computing device, a mobile phone, a laptop computer, a work station, and/or a similar communication device. Outputting the network feed from a user of the network group to the display device associated with the user associated with the domain name may be based on the user of the network group designating the network feed as a public network feed. For example, if an Acme Computer hardware engineer comments in the Acme Computers New Products Group on an invoice submitted by a Software Consultants' software engineer, the Acme Computer hardware engineer may designate this network feed as a private network feed instead of a public network feed. Therefore, the database system does not send the network feed commenting on the invoice to the Software Consultants' software engineers. Outputting a network feed to a display device associated with a user may include outputting each network feed to a website associated with the user. For example, a Software Consultants' software engineer that is subscribed to three Acme Computers network groups may receive all of the network feeds from these network groups via the software engineer's homepage, rather than having to log into three different webpages to view the network feeds from the three different network groups.

In block 112, a list of network groups to which a user is subscribed via a domain name and/or an email address is optionally output to a display device associated with the user, wherein the domain name and the domain name associated with the email address differ from each domain name for the network groups. In embodiments, this can include the database system outputting the list of the three Acme Computers network groups to which a Software Consultants' software engineer is subscribed to the software engineer's mobile phone.

When a user views the list of network groups and the network feeds at the user's homepage, the user may also browse a list of the network groups available for subscription by the general public, such as Acme Computers' Career Group, and select to subscribe to any of these groups in which the user is interested. The user may use a widget to embed any combination of the list of network groups, the network feeds, and the list of the network groups available for subscription by the general public on another webpage administered by the user, such as the user's Facebook™ home page.

In block 114, a user is optionally prompted to identify a network group in response to receiving a request from the user to output a network feed. For example and without limitation, this can include the database system prompting a Software Consultants software engineer to identify an Acme Computers network group when the software engineer requests to output a network feed.

In block 116, a network feed from a user associated with a domain name is output to display devices associated with users of a network group in response to determination that the user associated with the domain name is subscribed to the network group. By way of example and without limitation, this can include the database system sending a New Products Group network feed from a Software Consultants software engineer to Acme Computers' hardware engineers.

In block 118, a search request is optionally received from a user, wherein the search request includes criteria for selecting network feeds, and wherein the criteria identifies each network group or one of the network groups. In embodiments, this can include the database system receiving a search request from a Software Consultants software engineer to identify all network feeds that include the word "deadline" from the three Acme Computers network groups to which the software engineer is subscribed. Alternatively, the software engineer may search for a specific deadline, rather than all deadlines, by selecting the Acme Computers New Products Group for the search.

In block 120, network feeds that match criteria are optionally displayed to a display device associated with a user. For example and without limitation, this can include the database system displaying all network feeds that include the word "deadline" from the three Acme Computers network groups to which the Software Consultants software engineer is subscribed.

The method 100 may be repeated as desired. Although this disclosure describes the blocks 102-120 executing in a particular order, the blocks 102-120 may be executed in a different order.

Figure 2:
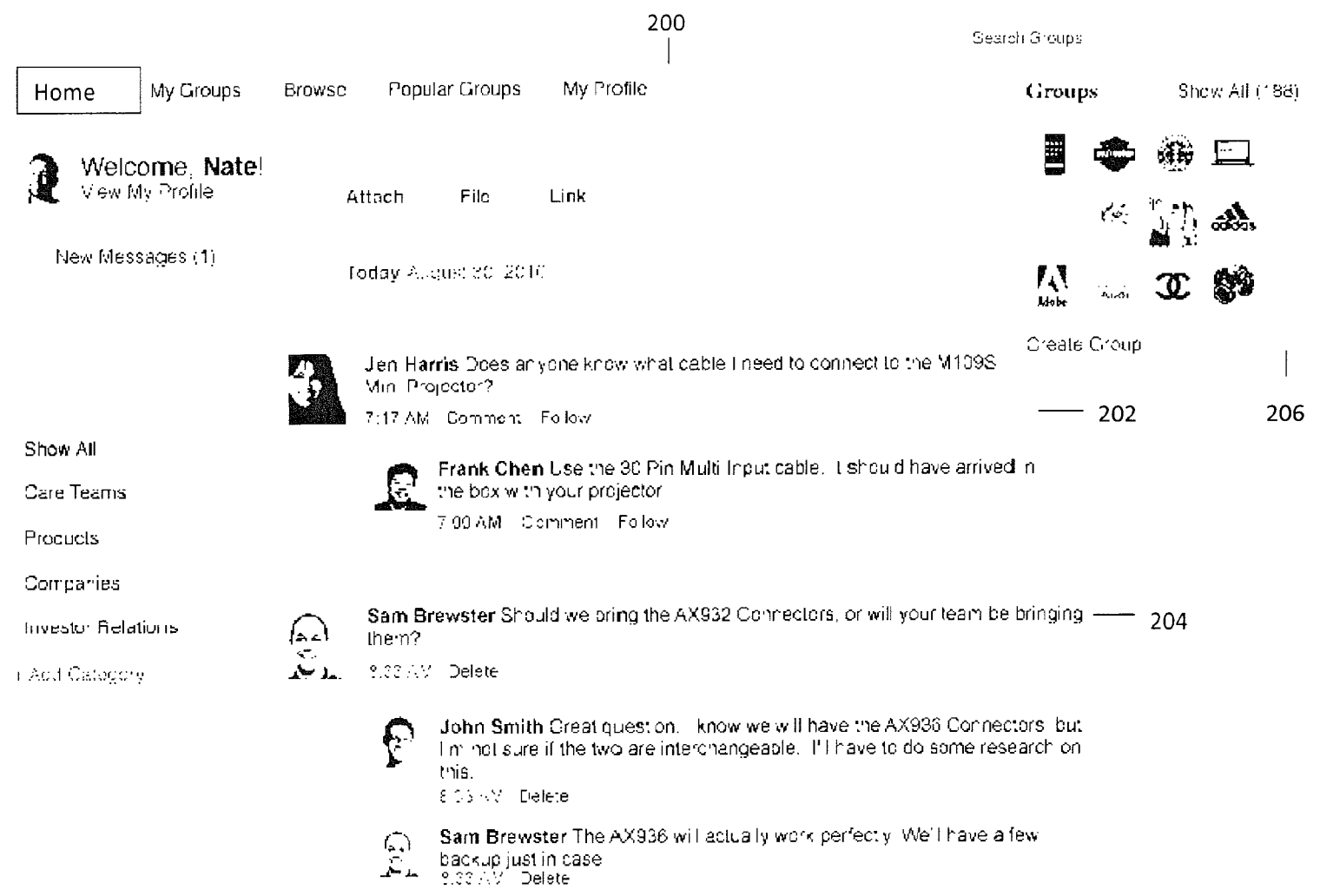

FIG. 2 is a screen shot illustrating a frame 200 of an example user interface screen of a display device for a public collaborative interface for private network groups in an embodiment. The frame 200 may include network feeds from a first network group 202, network feeds from a second network group 204, and icons depicting the user's network groups 206. A user homepage depicted by the frame 200 enables the user to review the network feeds from multiple network groups without having to log in separately for each network group. The user homepage also enables the user to respond to network feeds and to generate original network feeds for any of the user's network groups. Furthermore, the user homepage enables the user to select a specific network group and view a comprehensive list of the network feeds for the selected network group. Additionally, the user homepage enables the user to search network feeds for one of the user's network groups or for all of the user's network groups based on user-specified criteria. If a user is an administrator of a network group, the user homepage may enable the user to offer subscriptions to the network group based on domain names, roles with an organization associated with the domain name, and email addresses.

The frame 200 may be part of a larger display screen that includes fields for users to enter commands to create, retrieve, edit, and store records. The database system may output a display screen that includes the frame 200 in response to a search based on search criteria input via a user interface.

Because the frame 200 is a sample, the frame 200 could vary greatly in appearance. For example, the relative sizes and positioning of the text is not important to the practice of the present disclosure. The frame 200 can be depicted by any visual display, but is preferably depicted by a computer screen. The frame 200 could also be output as a report and printed or saved in electronic format, such as PDF. The frame 200 can be part of a personal computer system and/or a network, and operated from system data received by the network, and/or on the Internet. The frame 200 may be navigable by a user. Typically, a user can employ a touch screen input or a mouse input device to point-and-click to a location on the frame 200 to manage the text on the frame 200, such as a selection that enables a user to edit the text. Alternately, a user can employ directional indicators, or other input devices such as a keyboard. The text depicted by the frame 200 is an example, as the frame 200 may include a much greater amount of text. The frame 200 may also include fields in which a user can input textual information.

System Overview

Figure 3:
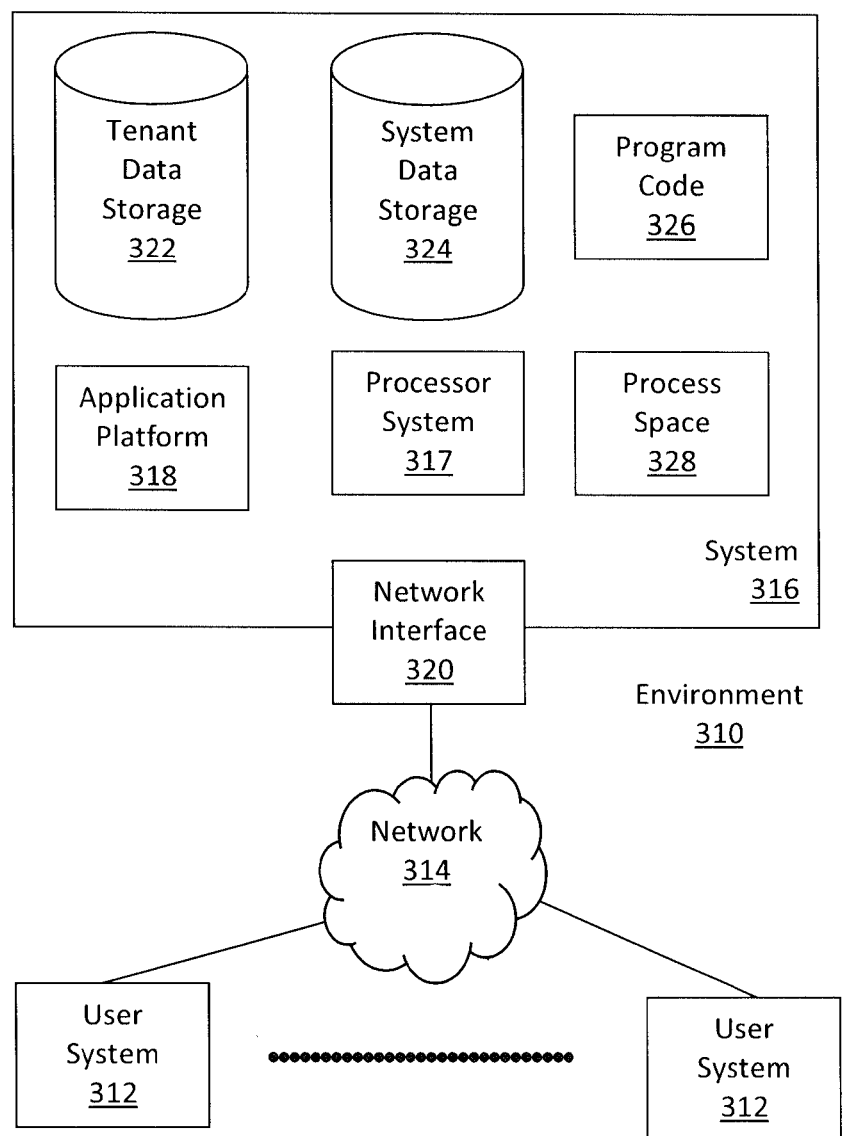
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 4:
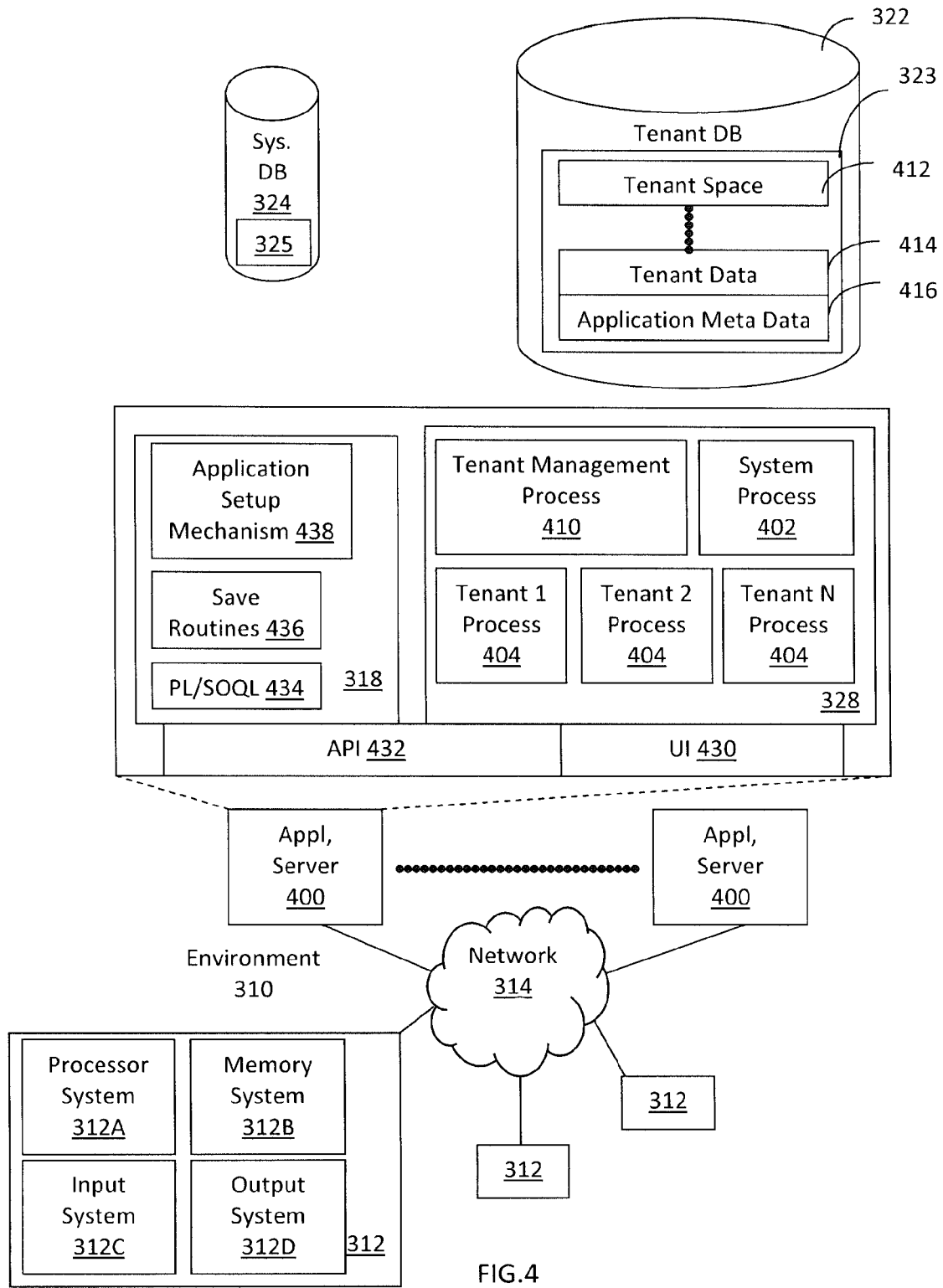
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for a public collaborative interface for a private network group, the apparatus comprising:
   a processor; and
   one or more stored sequences of instructions which, when executed by the processor, cause the processor to carry out the steps of:
      enabling a subscription to a private network group having a first domain name, by a plurality of users associated with a second domain name, the subscription being based on the association of the second domain name with the first domain name, the second domain name being received from an administrator of the private network group and being different than the first domain name;
      enabling a network feed from a user of the private network group to be outputted to a display device associated with at least one of the plurality of users associated with the second domain name in response to a determination that the at least one of the plurality of users is a member of the second domain name and a subscriber of the private network group based on the subscription of the second domain name to the private network group;
      enabling a network feed from at least one of the plurality of users associated with the second domain name to be outputted to display devices associated with users of the private network group in response to a determination that the at least one of the plurality of users is a member of the second domain name and a subscriber of the private network group based on the subscription of the second domain name to the private network group, and
      enabling the administrator of the private network group to disable at least one of the plurality of users associated with the second domain name from viewing a list of users associated with subscriptions, the list being outputted to the administrator;
   outputting a list of users associated with subscriptions to the administrator of the private network group.

2. The apparatus of claim 1, wherein the subscription to the private network group is based on a role associated with an organization.

3. The apparatus of claim 2, wherein the role associated with the organization is based at least in part on a determination made by an algorithm associated with a business directory.

4. The apparatus of claim 3, wherein the business directory comprises a user generated database for the business directory.

5. The apparatus of claim 4, wherein the business directory comprises data.com.

6. The apparatus of claim 1, wherein enabling the network feed from the user of the private network group to be outputted to the display device associated with the at least one of the plurality of users associated with the second domain name is based on the user of the private network group designating the network feed as a public network feed.

7. The apparatus of claim 1, wherein the domain name enables subscriptions by the general public.

8. A non-transitory machine-readable medium carrying one or more sequences of instructions for a public collaborative interface for private network groups, which instructions, when executed by one or more processors, cause the one or more processors to:
   enable a subscription to a private network group having a first domain name, by a plurality of users associated with a second domain name, the subscription being based on the association of the second domain name with the first domain name, the second domain name being received from an administrator of the private network group and being different than the first domain name;
   enable a network feed from a user of the private network group to be outputted to a display device associated with at least one of the plurality of users associated with the second domain name in response to a determination that the at least one of the plurality of users is a member of the second domain name and a subscriber of the private network group based on the subscription of the second domain name to the private network group;
   enable a network feed from at least one of the plurality of users associated with the second domain name to be outputted to display devices associated with users of the private network group in response to a determination that the is a member of the second domain name and a subscriber of the private network group based on the subscription of the second domain name to the private network group, and
   enable the administrator of the private network group to disable at least one of the plurality of users associated with the second domain name from viewing a list of users associated with subscriptions, the list being outputted to the administrator.

9. The non-transitory machine-readable medium of claim 8, wherein the subscription to the private network group is based on a role associated with an organization.

10. The non-transitory machine-readable medium of claim 9, wherein the role associated with the organization is based at least in part on a determination made by an algorithm associated with a business directory.

11. The non-transitory machine-readable medium of claim 10, wherein the business directory comprises a user generated database for the business directory.

12. The non-transitory machine-readable medium of claim 8, wherein enabling the network feed from the user of the private network group to be outputted to the display device associated with the at least one of the plurality of users associated with the second domain name is based on the user of the private network group designating the network feed as a public network feed.

13. The non-transitory machine-readable medium of claim 8, wherein the domain name enables subscriptions by the general public.

14. A method for a public collaborative interface for private network groups, the method comprising:

enabling a subscription to a private network group having a first domain name, by a user with an email address associated with a second domain name, the subscription being based on the association of the second domain name with the first domain name, the second domain name being received from an administrator of the private network group and being different than the first domain name;

enabling a network feed from a user of the private network group to be outputted to a display device associated with at least one of the plurality of users associated with the second domain name in response to a determination that the at least one of the plurality of users is a member of the second domain name and a subscriber of the private network group based on the subscription of the second domain name to the private network group;

enabling a network feed from at least one of the plurality of users associated with the second domain name to be outputted to display devices associated with users of the private network group in response to a determination that the at least one of the plurality of users is a member of the second domain name and a subscriber of the private network group based on the subscription of the second domain name to the private network group, and enabling the administrator of the private network group to disable at least one of the plurality of users associated with the second domain name from viewing a list of users associated with subscriptions, the list being outputted to the administrator.

15. The method of claim 14, wherein the subscription to the private network group is based on a role associated with an organization.

16. The method of claim 15, wherein the role associated with the organization is based at least in part on a determination made by an algorithm associated with a business directory.

17. The method of claim 16 wherein the business directory comprises a user generated database for the business directory.

18. The method of claim 17, wherein the business directory comprises data.com.

19. The method of claim 14, wherein enabling the network feed from the user of the private network group to be outputted to the display device associated with the at least one of the plurality of users associated with the second domain name is based on the user of the private network group designating the network feed as a public network feed.

20. The method of claim 14, wherein the domain name enables subscriptions by the general public.

* * * * *